United States Patent Office 3,418,279
Patented Dec. 24, 1968

3,418,279
NOVEL OXYMETHYLENE COPOLYMERS
Michael William Baumber, Colchester, England, assignor to Bakelite Xylonite Limited, a British corporation
No Drawing. Filed Dec. 24, 1964, Ser. No. 421,111
Claims priority, application Great Britain, Jan. 2, 1964, 144/64
11 Claims. (Cl. 260—67)

ABSTRACT OF THE DISCLOSURE

Novel oxymethylene copolymers have been prepared by the cationic polymerization of trioxane with a methylene dioxycyclohexane. The methylene dioxycyclohexane can be unsubstituted or substituted with alkyl groups located in a position meta or para to the ring carbon atom linked to an oxygen atom. The oxymethylene copolymers thus produced can be used to provide shaped articles by well known methods such as injection molding or extrusion.

---

This invention relates to novel oxymethylene copolymers and to the process for making them.

According to the present invention, it has been discovered that new and useful oxymethylene copolymers can be prepared by a process which comprises contacting trioxane, in the presence of a catalytic amount of a cationic polymerization catalyst, with a methylene dioxycyclohexane having the formula:

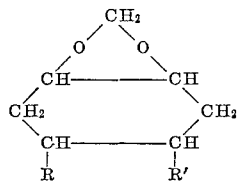

wherein each of R and R' is selected from the group consisting of hydrogen and alkyl groups having up to 18 carbon atoms.

The oxymethylene copolymers of this invention can be represented as having the following repeating units:

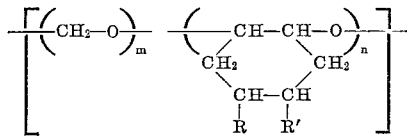

wherein $m$ and $n$ are integers denoting the degree of polymerization the sum of which is large enough to afford a normally solid polymer and, each of R and R' is hydrogen or an alkyl group having up to 18 carbon atoms. While the ratio $m:n$ is not narrowly critical, it is preferably in the range of about 99.9:0.1 to about 85:15.

Cationic catalysts suitable for the copolymerizations of this invention include halides such as $BF_3$, $SbF_3$, $PF_5$, $SnCl_4$, $TiCl_4$, $SOCl_2$, $PCl_3$, $PI_3$ and the like, alkyl sulfonic acids, aryl diazonium fluoroborates and fluorophosphates, perchloric acid, acetyl perchlorate, fluoroboric acid and like catalysts disclosed in "Polymerization of Aldehydes and Oxides" by Furukawa and Saegusa, p. 243, Interscience Publishers, 1963. It is preferred to employ co-ordination complexes of boron trifluoride and organic compounds in which oxygen or sulfur is the donor atom, as for example, aliphatic, alicyclic or aromatic alcohols, phenols, acids, ethers, acid anhydrides, esters, ketones, aldehydes, sulfides, or mercaptans. Specific preferred cationic catalysts are the co-ordination complexes of boron trifluoride with diethyl ether, dibutyl ether, phenol, or acetic acid as well as boron trifluoride complexes with methanol, ethanol, propanol, butanol, methyl acetate, phenyl acetate, benzoic acid, acetic anhydride, acetone methyl ethyl ketone, dimethyl ether, methyl phenyl ether, acetaldehyde, chloral, dimethyl sulfide or ethyl mercaptan and fluoroboric acid.

The catalytic amount of cationic catalysts used in this invention is not narrowly critical and can range from about 0.001% to about 1.0% based on the weight of trioxane.

The temperature at which the copolymerization is carried out can be varied widely, for instance between 1 and 100° C. Preferably a temperature in the range 50° to 90° C. is employed. Temperatures higher than 100° C. may be employed, but under these conditions it may be necessary to carry out the polymerization at pressures above atmospheric pressure.

The oxymethylene copolymers of this invention can be used to provide shaped articles such as automobile accessories, pump housings and impellers, electronic components and the like by methods well known in the art such as injection molding, extrusion and the like.

The process of the present invention may be carried out under widely varying pressures, the most suitable pressure depending on the polymerization temperature and the boiling point of the solvent, if one is used. The preferred pressure range lies between 1 and 2 atmospheres. Autogenous pressures may be employed.

The copolymerization is preferably carried out under practically anhydrous conditions. However, traces of water which may be introduced as impurities in any of the starting materials will not prevent copolymerization.

The copolymerization reaction can be carried out in bulk or in the presence of an inert diluent in which the monomeric material can be dissolved or dispersed. Many examples of suitable diluents are known in connection with the homopolymerization of trioxane. Examples include hydrocarbons such as cyclohexane and halogenated hydrocarbons such as 1,2-dichloro-ethane.

The number of polymerized comonomer units introduced into the oxymethylene copolymer molecules can be small in relation to the amount of trioxane residues present and still give products having improved properties as compared with the corresponding homopolymer. Most suitably the amount of copolymerizable material employed is such that 0.1% to 15% by weight of the polymer units in the copolymer chain are derived therefrom.

The oxymethylene copolymers produced according to the process of the present invention can be recovered by the techniques used for the recovery of polyoxymethylenes formed by the homopolymerization of trioxane. A catalyst neutralizing or removal step in the recovery process can be used if desired.

The following examples illustrate the production and properties of oxymethylene copolymers according to the present invention, wherein all parts and percentages are by weight.

EXAMPLE 1

A dried solution containing 75 grams of trioxane in 90 milliliters of ethylene dichloride was poured into a 250 milliliter reaction vessel fitted with a glass anchor stirrer, inlet and outlet tubes for dry nitrogen and 1.5 milliliters of methylene dioxycyclohexane were injected into the reaction vessel through the serum cap by means of a glass syringe. The apparatus was purged with nitrogen and the temperature raised to 70° C. 0.03 milliliters of boron trifluoride diethyl etherate were added using a microsyringe.

Copolymer started to form after 2 minutes and after 8 minutes the reaction was stopped and the polymer slurry filtered. The copolymer was stirred with 100 milliliters of ethylene dichloride at 70° C. for 30 minutes and was filtered, rinsed with acetone, and dried overnight in a vacuum oven at 60° C. A yield of 43% was obtained. The thermal degradation rate at 222° C. was 0.16%/min. after an initial rate of 5.1%/min. thus illustrating the thermal stability of the formed copolymer.

EXAMPLE 2

50 milliliters of a dried solution containing 40% trioxane in ethylene dichloride, were placed in a 100 milliliter reaction vessel as described in Example 1 and 1.5 milliliters of methylene dioxycyclohexane were injected through the serum cap by means of a glass syringe. The apparatus was purged with nitrogen and the temperature raised to 70° C. 0.01 ml. of 81% fluoroboric acid were added using a microsyringe.

Copolymer began to form after 45 secs., and after 1 hour the reaction was stopped and the polymer worked up as before.

A yield of 82.5% was obtained.

The thermal degradation rate at 222° C. was 0.35 after an initial rate of 5.7%/min.; illustrating the thermal stability of the formed copolymer.

What is claimed is:

1. An oxymethylene copolymer as represented by the repeating unit

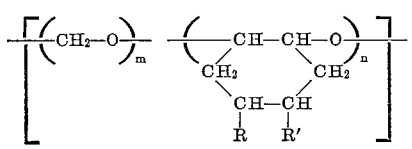

wherein each of R and R' is selected from the group consisting of hydrogen and alkyl groups having up to 18 carbon atoms, and $m$ and $n$ are integers denoting the degree of polymerization.

2. The copolymer claimed in claim 1 wherein the ratio of $m:n$ ranges from about 99.9:0.1 to about 85:15.

3. The copolymer claimed in claim 1 wherein R and R' are both hydrogen.

4. Process for the preparation of oxymethylene copolymer which comprises contacting trioxane with a methylene dioxycyclohexane having the formula

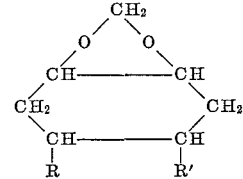

wherein each of R and R' are selected from the group consisting of hydrogen and alkyl groups having up to 18 carbon atoms, in the presence of a catalytic amount of a cationic polymerization catalyst at a temperature of at least 1° C.

5. The process claimed in claim 4 wherein each of R and R' is hydrogen.

6. The process claimed in claim 4 wherein the catalyst is boron trifluoride.

7. The process claimed in claim 4 wherein the catalyst is a co-ordination complex of boron trifluoride.

8. The process claimed in claim 7 wherein the co-ordination complex is boron trifluoride diethyl etherate.

9. The process claimed in claim 4 wherein the catalyst is fluoroboric acid.

10. The process claimed in claim 4 wherein the amount of catalyst is about 0.001% to about 1.0% based on the weight of the trioxane.

11. The process claimed in claim 4 carried out in a temperature range of about 1° C. to 100° C.

References Cited

UNITED STATES PATENTS

| | | |
|---|---|---|
| 2,968,646 | 1/1961 | Caldwell et al. _____ 260—67 |
| 3,256,246 | 6/1966 | Gutweiler et al. _____ 260—67 |
| 3,252,939 | 5/1966 | Small. |

FOREIGN PATENTS 962,244           Great Britain.

OTHER REFERENCES

Lichtenberger et al.: Societe Chimique de France Bulletin, Ser. 5, April 1961, pp. 854–857.

Furukawa and Saegusa: "Polymerization of Aldehydes and Oxides," Interscience Publishing Co., New York, 1963.

Head: Chemical Society Journal, pt. 2, 1960, pp. 1778–1783.

WILLIAM H. SHORT, *Primary Examiner.*

L. M. PHYNES, *Assistant Examiner.*